(12) United States Patent
Gallagher et al.

(10) Patent No.: US 12,000,105 B2
(45) Date of Patent: Jun. 4, 2024

(54) WRAPPER APPARATUS ENCOURAGING GROWTH OF MARINE LIFE

(71) Applicants: Timothy A. Gallagher, New Canaan, CT (US); Anthony E. J. Strange, Southbury, CT (US)

(72) Inventors: Timothy A. Gallagher, New Canaan, CT (US); Anthony E. J. Strange, Southbury, CT (US)

(*) Notice: Subject to any disclaimer, the term of this patent is extended or adjusted under 35 U.S.C. 154(b) by 3 days.

(21) Appl. No.: 17/872,824

(22) Filed: Jul. 25, 2022

(65) Prior Publication Data

US 2023/0024764 A1 Jan. 26, 2023

Related U.S. Application Data

(60) Provisional application No. 63/224,899, filed on Jul. 23, 2021.

(51) Int. Cl.
*E02D 5/60* (2006.01)

(52) U.S. Cl.
CPC ..................................... *E02D 5/60* (2013.01)

(58) Field of Classification Search
CPC . E02D 5/60; E02D 31/06; A01K 61/54; F16L 1/123
See application file for complete search history.

(56) References Cited

U.S. PATENT DOCUMENTS

| | | | |
|---|---|---|---|
| 4,743,142 A | 5/1988 | Shiraishi et al. | |
| 5,435,667 A | 7/1995 | Strange | |
| 6,113,313 A | 9/2000 | Blair et al. | |
| 8,635,973 B1 | 1/2014 | Shepard, III | |
| 2004/0240943 A1 | 12/2004 | Brensinger | |
| 2004/0240945 A1 | 12/2004 | Frantz | |
| 2006/0088386 A1 | 4/2006 | Ellis | |
| 2008/0200982 A1 | 8/2008 | Your | |
| 2011/0017144 A1 | 1/2011 | Calinski | |
| 2015/0132067 A1* | 5/2015 | Isham | E02B 3/16 405/211 |
| 2017/0233965 A1 | 8/2017 | Boasso | |
| 2023/0024764 A1* | 1/2023 | Gallagher | E02D 5/60 |

FOREIGN PATENT DOCUMENTS

| | | | | |
|---|---|---|---|---|
| FR | 2627054 A1 * | 8/1989 | | |
| FR | 2663586 A1 | 12/1991 | | |
| FR | 2848776 A1 * | 6/2004 | ........... | A01K 61/002 |
| FR | 2856555 A1 * | 12/2004 | ........... | A01K 61/002 |
| FR | 2964827 A1 * | 3/2012 | ........... | A01K 61/002 |
| WO | 2017/176234 A2 | 10/2017 | | |

OTHER PUBLICATIONS

"PCT Notification of Transmittal of the International Search Report and the Written Opinion", International Searching Authority, for PCT Application No. PCT/US/22/38203, dated Nov. 30, 2022, 9pgs.

* cited by examiner

*Primary Examiner* — Kyle Armstrong
(74) *Attorney, Agent, or Firm* — Buckley, Maschoff & Talwalkar LLC

(57) ABSTRACT

A system and method for a marine wrapper including a substrate, the substrate having an inner surface and an outer surface; and a coating fixedly adhered to the outer surface of the substrate, the coating including a bio-enhancing material to encourage marine growth on the outer surface of the substrate.

14 Claims, 6 Drawing Sheets

WRAPPER APPARATUS ENCOURAGING GROWTH OF MARINE LIFE

BACKGROUND

In marine construction projects, pilings are used to provide a foundation to ensure that structures (such as docks, piers, or the like) are properly supported. The pilings extend from the structure downward into the water and into the marine floor below. Piles are often made of wood. To prevent such wooden pilings from decay and corrosion, pile wrappers are often used. These pile wrappers are commonly designed to prevent the growth of marine life since the accumulation of marine growth often leads to the decay and corrosion of the pilings. For example, pile wrappers often are designed to inhibit marine growth on the exterior surface while providing corrosion protection on the interior surface. Examples of some such prior pile wrappers are shown in U.S. Pat. Nos. 4,743,142, 5,435,667 and 6,113,313. One system to promote marine life, WO 2017/176234 A2, discloses a proprietary blend of materials formed into precast structures that are designed to degrade over time. However, such a system might not be compatible with marine life sustainability goals.

Therefore, there exists a need for a marine wrapper to promote the growth of marine life on various marine structures while still preventing the structures from decaying and corroding.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Figure 1:
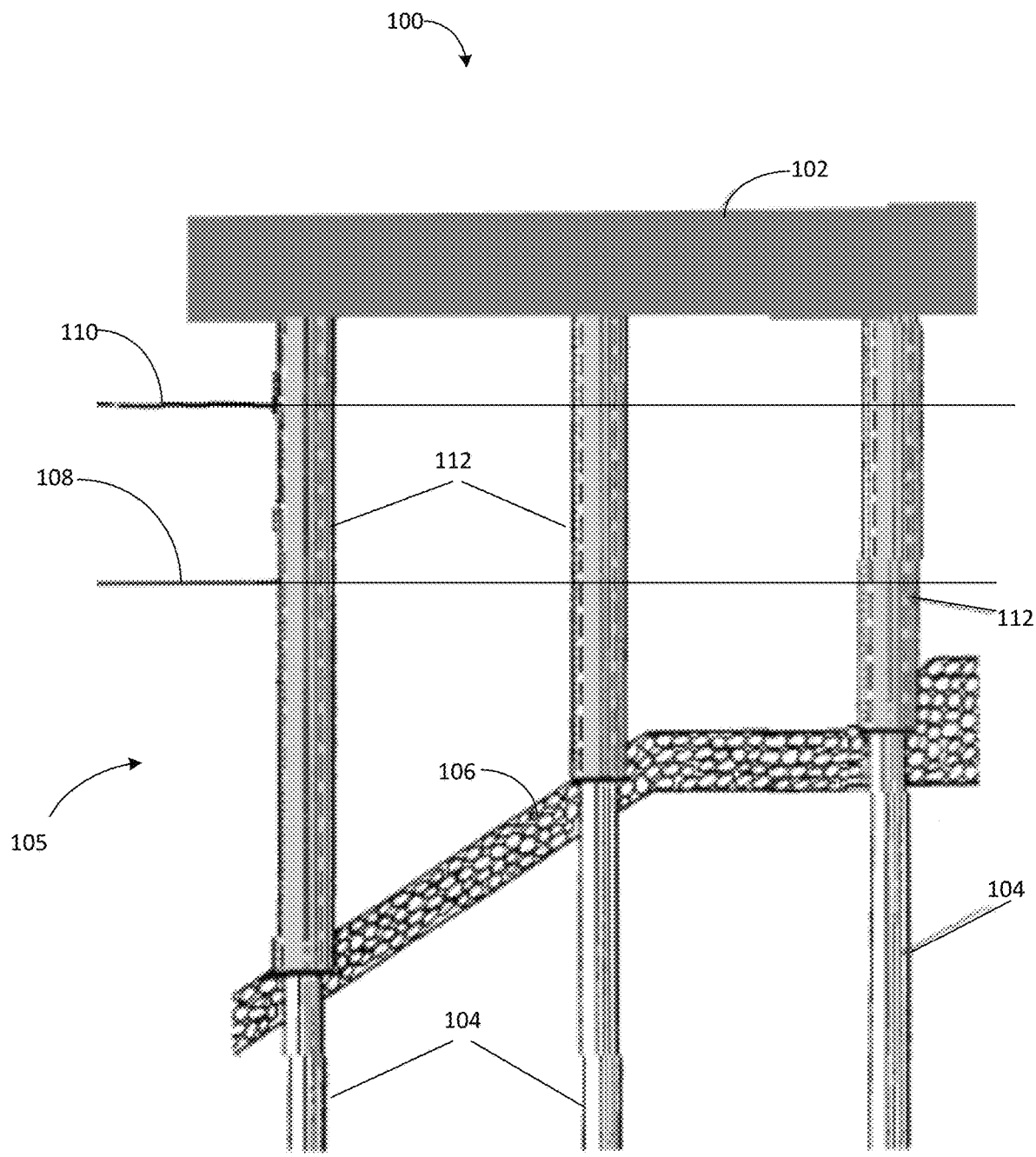
FIG. 1 is an illustrative depiction of a pile configuration, in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following detailed description, numerous specific details are set forth in order to provide a thorough understanding of embodiments. It should be appreciated that various modifications to the embodiments will be readily apparent to those skilled in the art, and the generic principles defined herein may be applied to other embodiments and applications without departing from the spirit and scope of the disclosure. However, it will be understood by those of ordinary skill in the art that the embodiments may be practiced without these specific details. In other instances, well-known methods, procedures, components and circuits have not been described in detail so as not to obscure the embodiments. Thus, the present disclosure is not intended to be limited to the embodiments shown but is to be accorded the widest scope consistent with the principles and features disclosed herein.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions may be made to achieve the developers' specific goals, such as compliance with technical, system-related, and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

For convenience and ease of exposition, a number of terms will be used herein. For example, the term "piling" will be used to refer to a structure that is used to stabilize, support, or provide a foundation for another structure (e.g., a dock, pier, a building, etc.) built over water for water to flow under the supported structure. The term piling may also be referred to herein simply as a "pile". Marine growth herein generally refers to any life form, whether animal life or plant life, that lives in water. While some embodiments herein may refer to or depict saltwater marine life or a saltwater environment, various aspects of the present disclosure may be useful in fresh water applications and use cases. In some aspects, a piling herein is not limited to a particular shape or configuration. For example, a marine wrapper or wrap herein may be applied to a piling configured as a post, a tube, a beam, a sea wall, a sheet or flat material, and other shapes, where the piling might be constructed of steel, concrete, wood (e.g., timber piles), fiberglass, and other materials. In general, embodiments of a marine wrap herein may be used with desirable results in conjunction with any piling disposed in a marine environment.

Particular aspects of the present disclosure relate to a new and useful method and system of providing a marine wrap or marine wrapper that encourages, supports, or otherwise facilitates the growth of marine life thereon. In some aspects, the marine wrapper presented herein may be used with traditional construction processes and materials. As such, aspects of the present disclosure may be combined with traditional construction processes and materials, as well as be implemented in newly or yet to be developed construction processes and materials. In general, the marine wrapper disclosed herein might promote, provide, or otherwise support one or more significant features including, for example, enhancing or facilitating marine growth on an outer surface thereof and preserving the service life of a structure mated with an inner surface of the marine wrap.

Pursuant to some embodiments, a marine wrapper of the present disclosure may be formed with a textured relief pattern on an exterior facing surface of the pile wrapper. In some embodiments, the pile wrapper may be coated with a bio enhancing product on the exterior facing surface of the pile wrapper. In some embodiments, a combination of a bio enhancing product and a textured relief pattern may be used. In some embodiments, the bio enhancing coating and/or the textured relief pattern are formed to encourage the attachment and growth of bivalves (or oysters). Bivalves filter the water they live in which removes nitrogen and pollutants, thereby cleaning the environment as well as providing a food source for other marine life.

FIG. 1 is an illustrative depiction of a piling or pile configuration 100, in accordance with an example embodiment. Pile configuration 100 includes a structure 102 that extends over a marine area 105 having a mean high water mark 110 and a mean low water mark 108. Structure 102 (e.g., a pier, dock, or building, etc.) is supported by a number of pilings or piles 104 that extend downward from structure 102 into a marine floor 106. One or more piles 104 may be wrapped, enveloped, or enclosed in a marine wrapper 112, in accordance with an example embodiment herein. In some instances, marine wrapper 112 may extend from about approximately the marine floor 106 to about the bottom of the structure 102.

In some embodiments, marine wrapper 112 of the present disclosure may have an outer or exterior facing surface that faces outwardly away from the pile 104 and is exposed to marine area 105 and an interior facing surface that is inwardly facing and adjacently proximate to a pile 104. In some aspects, the exterior outer surface of marine wrapper 112 includes material or a coating of material that is bio-enhancing to encourage or support marine growth thereon (i.e., marine growth on the outer surface of the marine wrap). In some aspects, the inner surface of marine wrapper 112 that mates with or is otherwise in close proximate contact with piling 104 may be configured or comprise a material that preserves, enhances, or extends that useful service life of the piling that the inner surface of the marine wrapper contacts. In some embodiments, the inner surface of the marine wrapper might promote the inhibition of marine growth thereon.

Figure 2:
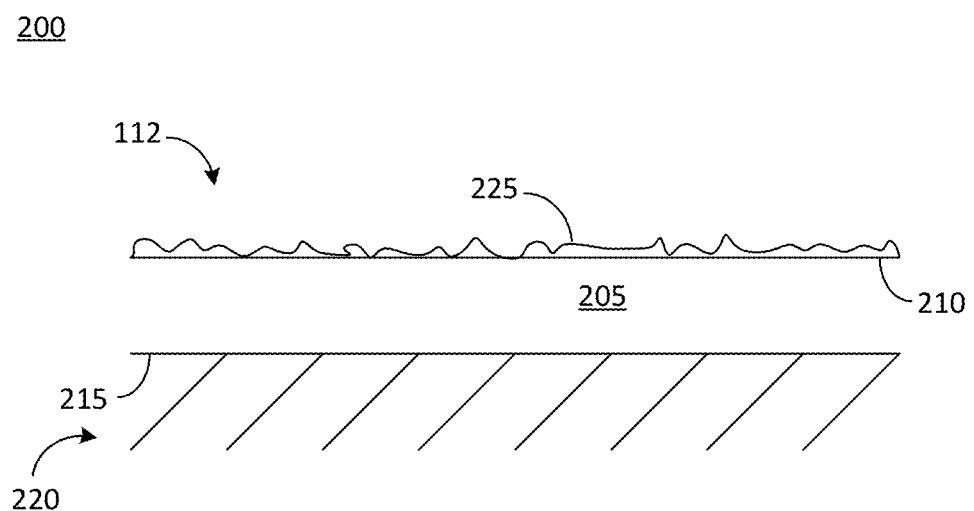
FIG. 2 is an illustrative depiction of some aspects of a marine wrapper, in accordance with an example embodiment.

FIG. 2 is an illustrative depiction 200 of some aspects of a marine wrapper, in accordance with an example embodiment herein. FIG. 2 shows a substrate 205 of the marine wrapper 112. As illustrated, the substrate has an outer surface 210 and an inner surface 215. As seen, inner surface 215 of the marine wrapper substrate is adjacent to, mated with, or otherwise in physical contact with a structure 220. In some instances, structure 220 may be a piling such as, for example, piling 104 shown in FIG. 1. Outer surface 210 of marine wrapper substrate 205 may typically be exposed to a marine area. In accordance with some embodiments herein, a bio-enhancing coating 225 may be applied or otherwise affixed to outer surface 210 of the marine wrapper substrate to encourage and promote the growth of marine life on the outer surface of the marine wrapper.

Figure 3:
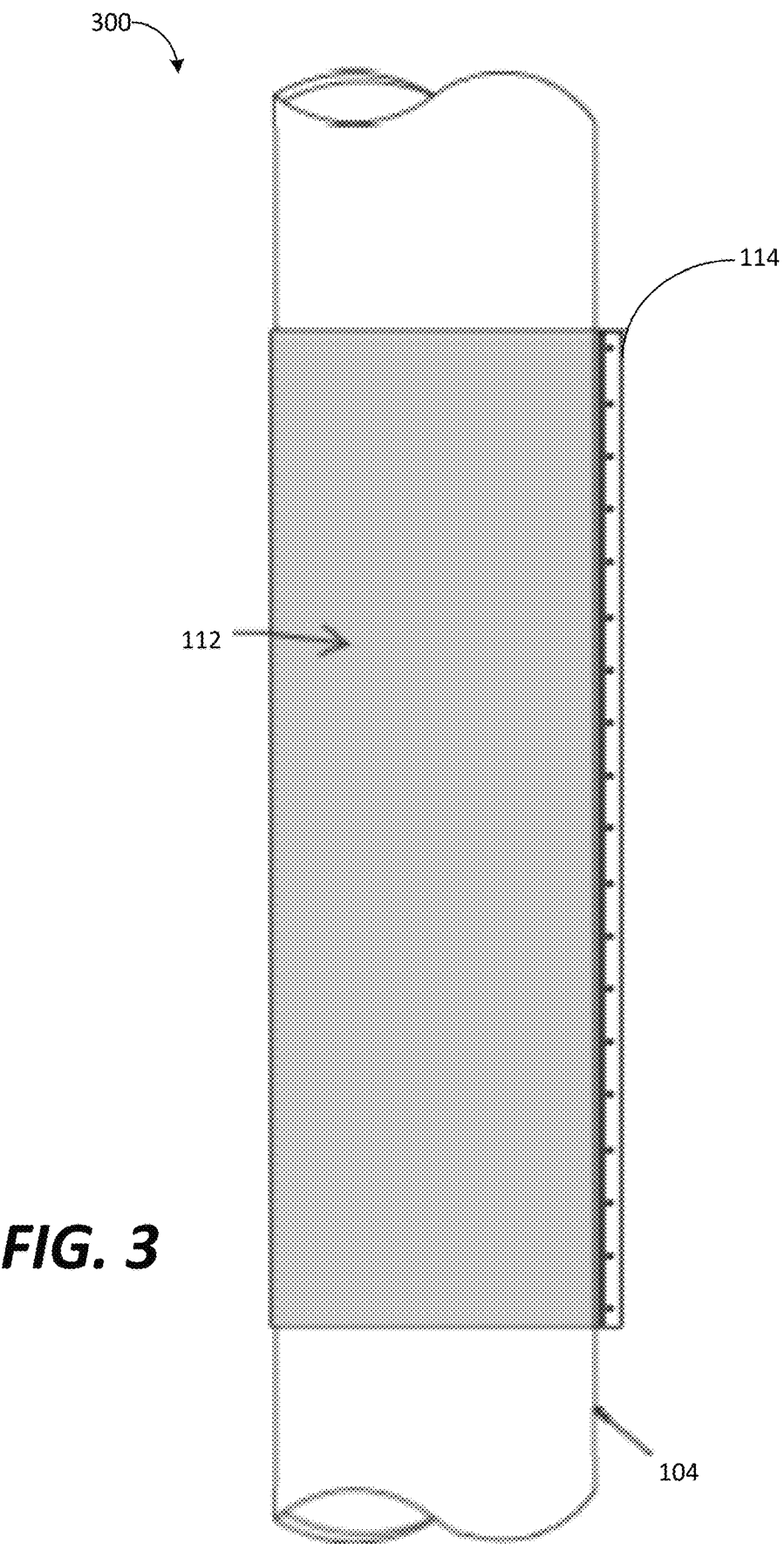
FIG. 3 is an illustrative depiction of some aspects of a marine wrapper applied to a piling, in accordance with an example embodiment.

FIG. 3 is an illustrative depiction 300 of some aspects of a marine wrapper 112 installed on a pile 104. Marine wrapper 112 of FIG. 2 is configured with an adhesive on the outer surface of a substrate of the marine wrapper that is exposed to the water, whereas an opposing inner surface of the marine wrapper mates with and contacts pile 104.

In some aspects, an adhesive herein bonds to marine wrapper 112, where the marine wrapper might comprise, for example, a polyurethane material. Referring still to FIG. 2, in some embodiments an adhesive may be applied to outer surface 210 of substrate 205 of marine wrapper 112. A bio-enhancing coating (e.g., coating 225) may be fixedly adhered to the outer surface of the substrate of the marine wrapper by an adhesive having, for example, a neutral pH. In some embodiments, an adhesive herein might belong to a class of adhesives referred to and known as moisture cure adhesives. In some instances, an adhesive herein might include a roof adhesive that has elastic properties compatible with a marine wrapper herein, be inert, non-toxic, and rated for a wet environment.

In some embodiments, a marine wrapper may be stretched during an installation process of the marine wrapper onto a piling. For example, as a marine wrapper is wrapped around a tubular-shape steel piling to install it on the piling such that the inner surface of the marine wrapper is in close (i.e., proximate) physical contact with the piling, the substrate of the marine wrapper may be stretched or extended. In some instances, a dimension (e.g., a length or a width) of the substrate of a marine wrapper of the present disclosure may be elongated (or otherwise stretched or extended) by about 5% to about 10% during the installation thereof on a piling. Accordingly, an adhesive used to adhere a coating to the outer surface of a marine wrapper herein might have the characteristic property of remaining attached to the outer surface of the substrate when cured and when exposed to a marine environment. That is, the adhesive might be elastic to the extent that it stretches with the substrate of the marine wrapper to which it is applied.

In some embodiments, certain types of marine growth are attracted to certain environments. For example, while oysters and marine bivalves may grow on mostly any hard structure, oysters prefer other oysters to create oyster reefs. Calcium carbonate is the main constituent chemical compound comprising oyster shells. Advantageously, oyster shells are relatively inexpensive, readily available, inert, organic, recyclable, and can be procured through recycling efforts. In some embodiments, a coating material comprising, at least in part, calcium carbonate may be applied via an adhesive to an outer surface of a marine wrapper substrate herein. Various blends of calcium carbonate have been realized by Applicant(s) as well-performing bio-enhancing coatings for a marine wrapper of the present disclosure. Examples of such coatings include an "oyster flour" consisting of 100% ground oyster shells (although other percentages of oyster shells might be compatible). In some instances, the oyster flour might comprise a granular powder, where grains are about 0.3 millimeters to about 0.35 millimeters in size. Some other properties of an oyster flour coating herein may include it being insoluble and having coating properties such that it can be applied with little to no gaps on a surface. Another blend of calcium carbonate realized to be a well-performing bio-enhancing coating for a marine wrapper of the present disclosure includes crushed oyster shells that result in chips or flakes of oyster shells. In one embodiment, the oyster shell chips may be sized between 0.25 inch and 0.5 inch and insoluble.

In some embodiments, a coating material herein may include both a granular powder form of calcium carbonate and a plurality of calcium carbonate chips. The combination of calcium carbonate granular powder and calcium carbonate chips provides a coating that has an increased surface area to facilitate oyster attachment due to the chips, wherein gaps between the chips are infilled by the granular powder. That is, the combination of calcium carbonate granular powder and calcium carbonate chips may provide a coating with increased surface area (relative to a coating of granular powder alone) and complete coverage (as compared to a coating of oyster chips alone).

Figure 4:
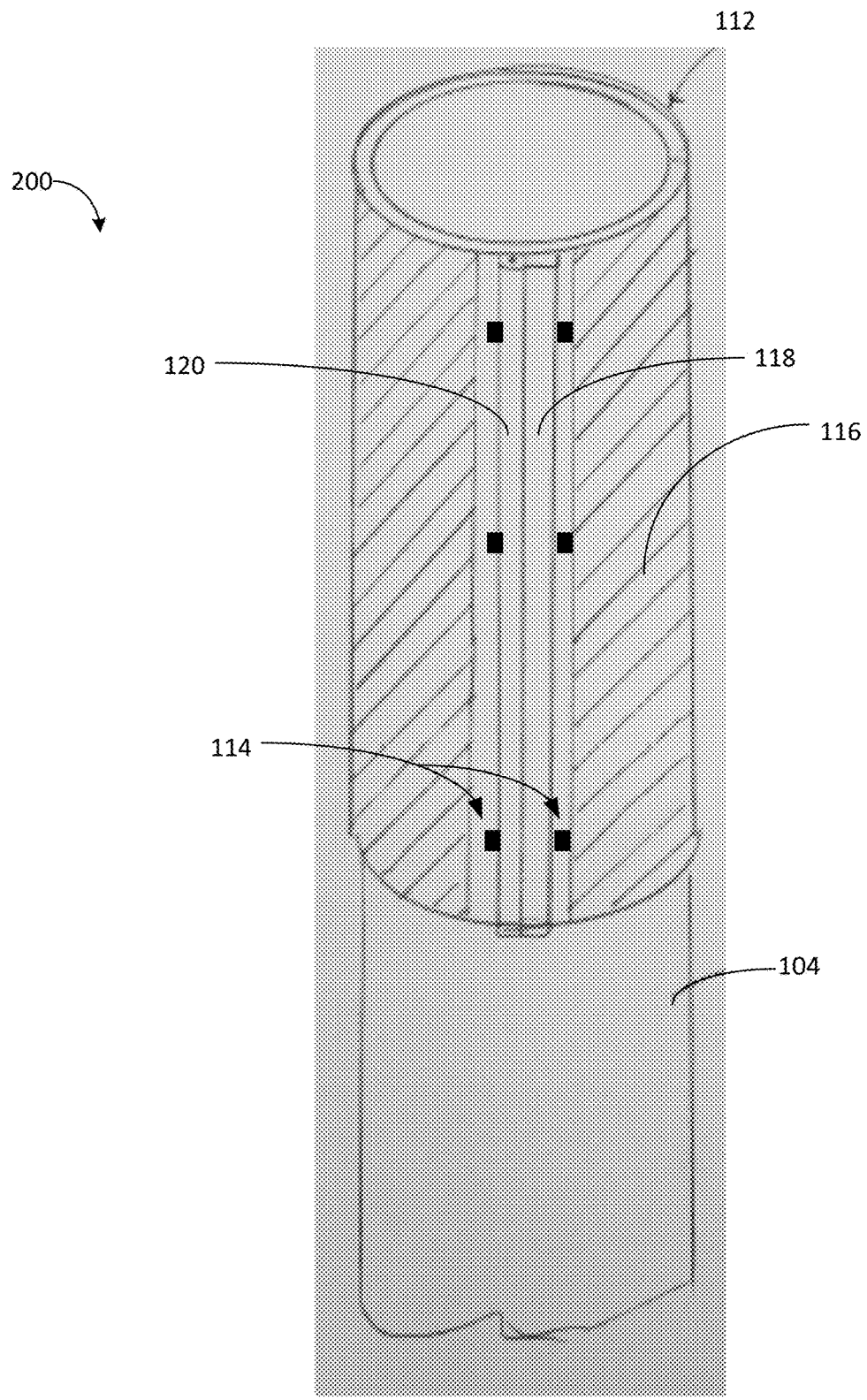
FIG. 4 is an illustrative depiction of some details of a marine wrapper applied to a piling, in accordance with an example embodiment.

FIG. 4 is an illustrative depiction of a portion of a pile having a marine wrapper installed thereon, in accordance with an example embodiment. The marine wrapper 112 shown in the example o FIG. 4 is formed with a patterned surface 116. Patterned surface 116 is designed to provide marine growth with numerous points of attachment, thereby encouraging growth on the exterior surface of the marine wrapper 112. In some aspects, a relief pattern of any type may be used in some embodiments. For example, relief ridges (such as shown in the example of FIG. 4) might function to provide an increased surface area with more attachment points (as compared to a flat surface) that offer mounts or grips for bivalves or other marine growth to maintain roots or attachments onto the marine wrapper 112. In some embodiments, patterned surface 116 may also be coated with a bio-accumulator that further facilitates marine growth.

Referring still to FIG. 4, marine wrapper 112 may be attached or secured to pile 104 by wrapping opposing ends 118 and 120 around pile 104. Once the marine wrapper 112 is wrapped around pile 104, it can be secured in place by one or more securing mechanisms 114 (e.g., screw, nut and bolt, pin, lock, etc.) to ensure the marine wrapper 112 is fixed in position. Pursuant to some embodiments, the adhesive and/or other material coating the exterior surface of the pile wrapper 112 is a bio-accumulator that facilitates marine growth.

Figure 5:
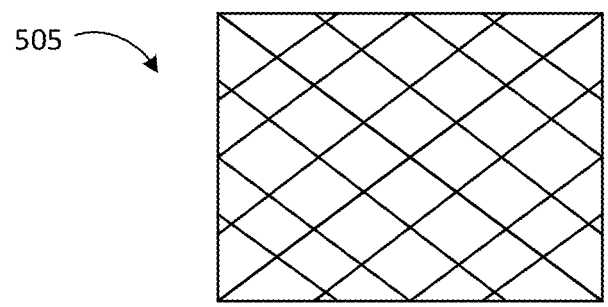
FIG. 5 is an illustrative depiction of aspects of an outer surface of a marine wrapper substrate, in accordance with example embodiments.

FIG. 5 is an illustrative depiction of some aspects of an outer surface of a marine wrapper substrate, in accordance with example embodiments. For example, FIG. 5 shows a portion of an outer surface of marine wrapper substrate. As shown, the substrate is configured in a "diamond" pattern.

Figure 6:
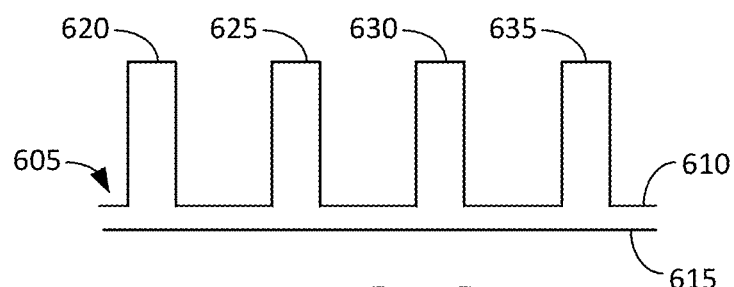
FIG. 6 is an illustrative depiction of some aspects of a marine wrapper substrate, according to some embodiments herein.

FIG. 6 is an illustrative depiction 600 of some aspects of a marine wrapper substrate, in accordance with example embodiments. FIG. 6 includes a substrate 605 having an outer surface 610 and an inner surface 615. The example marine wrapper substrate 605 is configured in a relief pattern including the raised portions 620, 625, 630, and 635. The raised portions of the marine wrapper substrate in FIG. 6 provides an increased surface area to support marine growth. In some instances, substrate 605 may be coated with a bio-enhancer or a bio-accumulator to further promote marine growth thereon.

Figure 7:
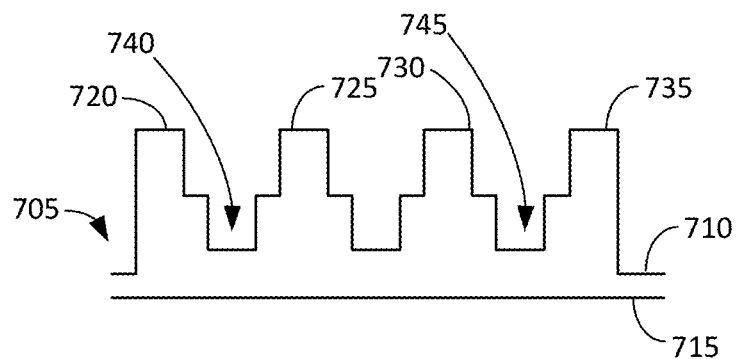
FIG. 7 is an illustrative depiction of some aspects of a marine wrapper substrate, according to some embodiments herein.

FIG. 7 is an illustrative depiction 700 of some aspects of a marine wrapper substrate, in accordance with example embodiments. FIG. 7 includes a substrate 705 having an outer surface 710 and an inner surface 715. The example marine wrapper substrate 705 is configured as a relief pattern including the raised portions 720, 725, 730, and 735. Marine wrapper 705 further includes a number of relief recesses 740 and 745. The combination of the raised portions of the marine wrapper and the relief recesses in substrate 705 cooperate to provide an increased surface area to support marine growth (more than a flat surface and more than raised surfaces alone). In some instances, substrate 705 might also be configured with a bio-enhancer to further encourage or support marine growth thereon.

Figure 8:
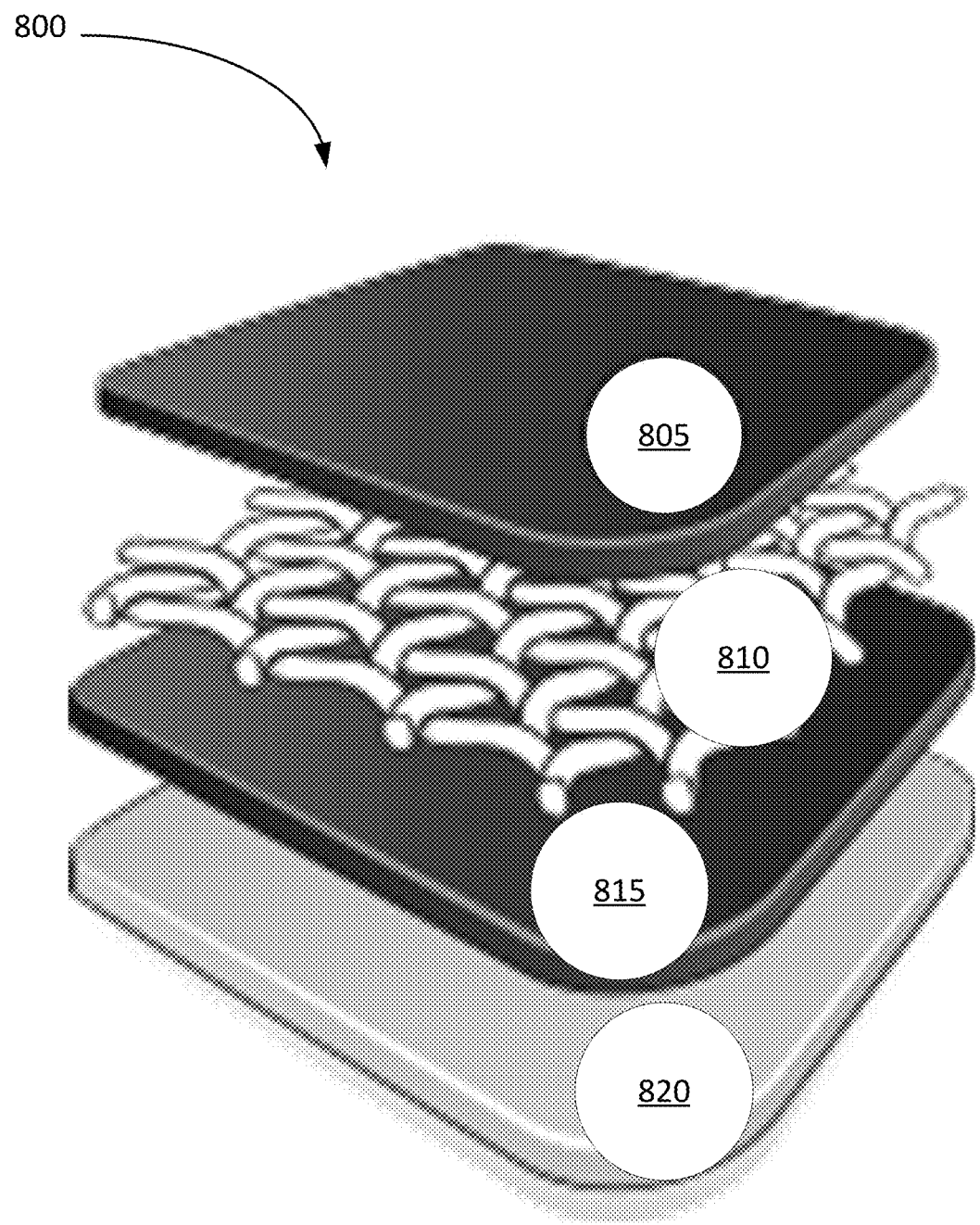
FIG. 8 is an illustrative depiction of some detailed aspects of a marine wrapper substrate, according to some embodiments herein.

FIG. 8 is an illustrative depiction of some detailed aspects of a marine wrapper substrate, according to some embodiments herein. In particular, FIG. 8 is a detailed view of a cross-section of a substrate 800 for a marine wrapper, in accordance with some embodiments herein. Substrate 800 includes an outer polyurethane layer 805. In some instances, this outer layer may have the characteristic properties of being highly abrasion-resistant and UV-stable and might function to provide a long-term environmental outer barrier. Layer 810 may include a memory-enhanced polyamide reinforcing scrim. In some aspects, during an installation of a marine wrapper herein, the scrim creates hoop-tension forces sufficient to resist long-term creep, as well, for example, as one-hundred year storms. Layer 815 of substrate 800 includes an inner polyurethane layer. Layer 820 may include a polyester or polypropylene felt inner layer. In some instances, the felt might be applied with gel to prevent steel corrosion. In some other instances, the layer 820 might be infused with concrete rebar chloride penetrant inhibitors (e.g., the file wrapper will be applied to a concrete pile), a wood preservative (e.g., the file wrapper is applied to a wood timber piling), and other piling life preserving treatments.

In some embodiments, a marine wrapper surface material herein might include ethylene propylene diene monomer rubber (EPDM) or polyurethane (PU), depending on the structure the wrapper is being installed on. For example, EPDM may be used when marine wrap is installed on timber piles and PU may be used when the marine wrapper is installed on steel and concrete piles.

Thus, embodiments may provide environments and structures to facilitate and encourage marine growth on the exterior surface of marine wrappers, thereby improving environmental conditions in watersheds and areas around marine structures.

Although specific hardware and data configurations have been described herein, note that any number of other configurations may be provided in accordance with embodiments of the present invention (e.g., in other types of environments). While embodiments have been described in conjunction with wrappers that are designed to wrap around "piles", embodiments may be used to wrap or otherwise seal other types of structures that are partially or fully submerged in marine environments. As such, while embodiments are described as being "pile wrappers", the term is not intended to be limiting, and other types of "wrappers" may be provided.

Although the present disclosure has been described in connection with specific examples and embodiments, it should be understood that various changes, substitutions, and alterations apparent to those skilled in the art can be made to the disclosed embodiments without departing from the spirit and scope of the disclosure as set forth in the appended claims.

The invention claimed is:

1. A marine wrapper, comprising:
    a substrate, the substrate having an inner surface and an outer surface;
    a material fixedly adhered to the inner surface of the substrate to promote at least one of inhibition of marine growth thereon and preservation of a structure mated to the inner surface of the substrate; and
    a coating fixedly adhered to the outer surface of the substrate, the coating including a bio-enhancing material to encourage marine growth on the outer surface of the substrate, the coating being configured as both a granular powder form of calcium carbonate and a plurality of calcium carbonate chips.

2. The marine wrapper of claim 1, wherein the structure comprises a piling.

3. The marine wrapper of claim 1, wherein the structure is constructed of a material including at least one of steel, concrete, wood, and fiberglass.

4. The marine wrapper of claim 1, wherein the coating is fixedly adhered to the outer surface of the substrate by an adhesive.

5. The marine wrapper of claim 4, wherein characteristic properties of the adhesive include remaining attached to the outer surface of the substrate when exposed to a marine environment and remaining elastic when cured.

6. The marine wrapper of claim 5, wherein the adhesive maintains its attachment to the outer surface of the substrate with an elongation of about 5 percent to about 10 percent of a dimension of the outer surface of the substrate.

7. The marine wrapper of claim 1, wherein at least one of the inner surface and the outer surface of the substrate comprises ethylene propylene diene monomer rubber (EPDM).

8. The marine wrapper of claim 1, wherein the granular powder includes ground oyster shells.

9. The marine wrapper of claim 1, wherein the plurality of chips includes crushed oyster shells.

10. The marine wrapper of claim 1, wherein the granular powder includes grains about 0.3 millimeters to about 0.35 millimeters in size.

11. The marine wrapper of claim 10, wherein the relief pattern includes one or more recesses therein.

12. The marine wrapper of claim 1, wherein the outer surface of the substrate is configured in a relief pattern.

13. The marine wrapper of claim 1, wherein the marine growth includes at least one of animal life and plant life.

14. The marine wrapper of claim 1, wherein the marine life includes oysters.

\* \* \* \* \*